(12) United States Patent
Peng et al.

(10) Patent No.: US 11,506,920 B2
(45) Date of Patent: Nov. 22, 2022

(54) DISPLAY DEVICE AND SCREEN ANTI-PEEPING DEVICE

(71) Applicant: Coretronic Corporation, Hsin-Chu (TW)

(72) Inventors: Yi-Hsing Peng, Hsin-Chu (TW); Bing-Han Tsai, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 54 days.

(21) Appl. No.: 17/163,570

(22) Filed: Feb. 1, 2021

(65) Prior Publication Data

US 2021/0255492 A1 Aug. 19, 2021

(30) Foreign Application Priority Data

Feb. 19, 2020 (CN) .......................... 202010101108.5

(51) Int. Cl.
*G02F 1/13* (2006.01)
*G02F 1/1343* (2006.01)
*G02F 1/1345* (2006.01)
*G02F 1/1347* (2006.01)

(52) U.S. Cl.
CPC ........ *G02F 1/1323* (2013.01); *G02F 1/13458* (2013.01); *G02F 1/134309* (2013.01); *G02F 1/1345* (2013.01); *G02F 1/1347* (2013.01); *G02F 1/13452* (2013.01); *G02F 2201/124* (2013.01)

(58) Field of Classification Search
CPC ............. G02F 1/13458; G02F 1/13452; G02F 1/1345; G02F 1/1323; G02F 1/1347
See application file for complete search history.

(56) References Cited

U.S. PATENT DOCUMENTS

| | | | | |
|---|---|---|---|---|
| 2004/0046909 | A1* | 3/2004 | Sekiguchi | G02F 1/13452 349/113 |
| 2009/0040450 | A1* | 2/2009 | Nakaminami | H05K 1/147 361/822 |
| 2009/0244470 | A1* | 10/2009 | Yamate | G02F 1/13476 349/150 |
| 2010/0265435 | A1* | 10/2010 | Hwang | G02F 1/133504 349/64 |
| 2014/0368752 | A1* | 12/2014 | Wu | G02F 1/13338 349/12 |

(Continued)

FOREIGN PATENT DOCUMENTS

| | | |
|---|---|---|
| CN | 104851394 | 8/2015 |
| CN | 106094289 | 11/2016 |

(Continued)

*Primary Examiner* — Alexander P Gross
(74) *Attorney, Agent, or Firm* — JCIPRNET

(57) ABSTRACT

A display device and a screen anti-peeping device are provided. The display device includes a display panel and the screen anti-peeping device. The display panel includes at least one bonding area, wherein the bonding area is configured to be coupled to an outer lead. The screen anti-peeping device overlaps with the display panel and includes a plurality of electrode sets, wherein each of the electrode sets includes a first electrode and a second electrode. At least one of the electrode sets is selected to be coupled to at least one control lead, and the selected electrode set is misaligned with the bonding area.

13 Claims, 4 Drawing Sheets

(56) References Cited

U.S. PATENT DOCUMENTS

2021/0223596 A1\* 7/2021 Ishii ..................... G02F 1/1337

FOREIGN PATENT DOCUMENTS

| CN | 110147010 | 8/2019 |
|----|-----------|--------|
| TW | 200709162 | 3/2007 |
| TW | 201812545 | 4/2018 |
| TW | M586364   | 11/2019 |

\* cited by examiner

DISPLAY DEVICE AND SCREEN ANTI-PEEPING DEVICE

CROSS-REFERENCE TO RELATED APPLICATION

This application claims the priority benefit of China application serial no. 202010101108.5, filed on Feb. 19, 2020. The entirety of the above-mentioned patent application is hereby incorporated by reference herein and made a part of this specification.

BACKGROUND OF THE INVENTION

1. Field of the Invention

The invention relates to a display technology, and in particular, to a display device and a screen anti-peeping device.

2. Description of Related Art

With the development of the display technology, consumer electronic products become a part of daily life, and a user reads entertainment media, a paper material, or private information through a screen of an electronic product. In order to prevent a person around you from peeking at displayed contents on a screen, the electronic device may be equipped with a display device with an anti-peeping function to maintain privacy safety of the user.

At present, a common display device with the anti-peeping function is made through assembly of a screen anti-peeping device and a display module after the screen anti-peeping device and the display module are manufactured separately. Because FPC positions of the display modules produced by various manufacturers are not fixed, a control lead position of the screen anti-peeping device needs to be determined according to input and output line positions of the display module, so that the screen anti-peeping device is not compatible with display modules with different specifications. Therefore, during manufacturing, it is necessary to implement avoidance design for a flexible printed circuit (FPC) of the display module and a control lead of the screen anti-peeping device, resulting in a waste of development resources.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

The invention provides a display device and anti-peeping device. An assembled lead position of the screen anti-peeping device of the display device is selective to be adapted to display panels with a plurality of different lead positions, so that versatility of the screen anti-peeping device can be improved, and a burden of a manufacturer for material preparation can be further relieved.

An embodiment of the invention provides a display device including a display panel and a screen anti-peeping device. The display panel includes at least one bonding area, the at least one bonding area being coupled to an outer lead. The screen anti-peeping device overlaps with the display panel and includes a plurality of electrode sets, each of the electrode sets including a first electrode and a second electrode. At least one of these electrode sets is selected to be coupled to at least one control lead, and the selected electrode set is misaligned with the bonding area.

An embodiment of the invention provides a screen anti-peeping device, including an upper conductive layer, a lower conductive layer, a viewing-angle adjustment layer, and a plurality of electrode sets, where each electrode set includes a first electrode and a second electrode, the first electrode being coupled the upper conductive layer, and the second electrode is coupled to the lower conductive layer, at least one of these electrode sets being selected to be coupled to at least one control lead.

Based on the foregoing, the invention provides a display device and a screen anti-peeping device. The display device includes the foregoing screen anti-peeping device. The screen anti-peeping device is disposed in a connection area to be coupled to a plurality of electrode sets of a control lead. During assembly, a manufacturer keeps off a bonding area of the display panel but selects an appropriate electrode set to be coupled to the control lead of the screen anti-peeping device. Because a plurality of electrode sets may be selected, the screen anti-peeping device may be shared with various display panels, so that versatility is improved.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

It is to be understood that other embodiment may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1:
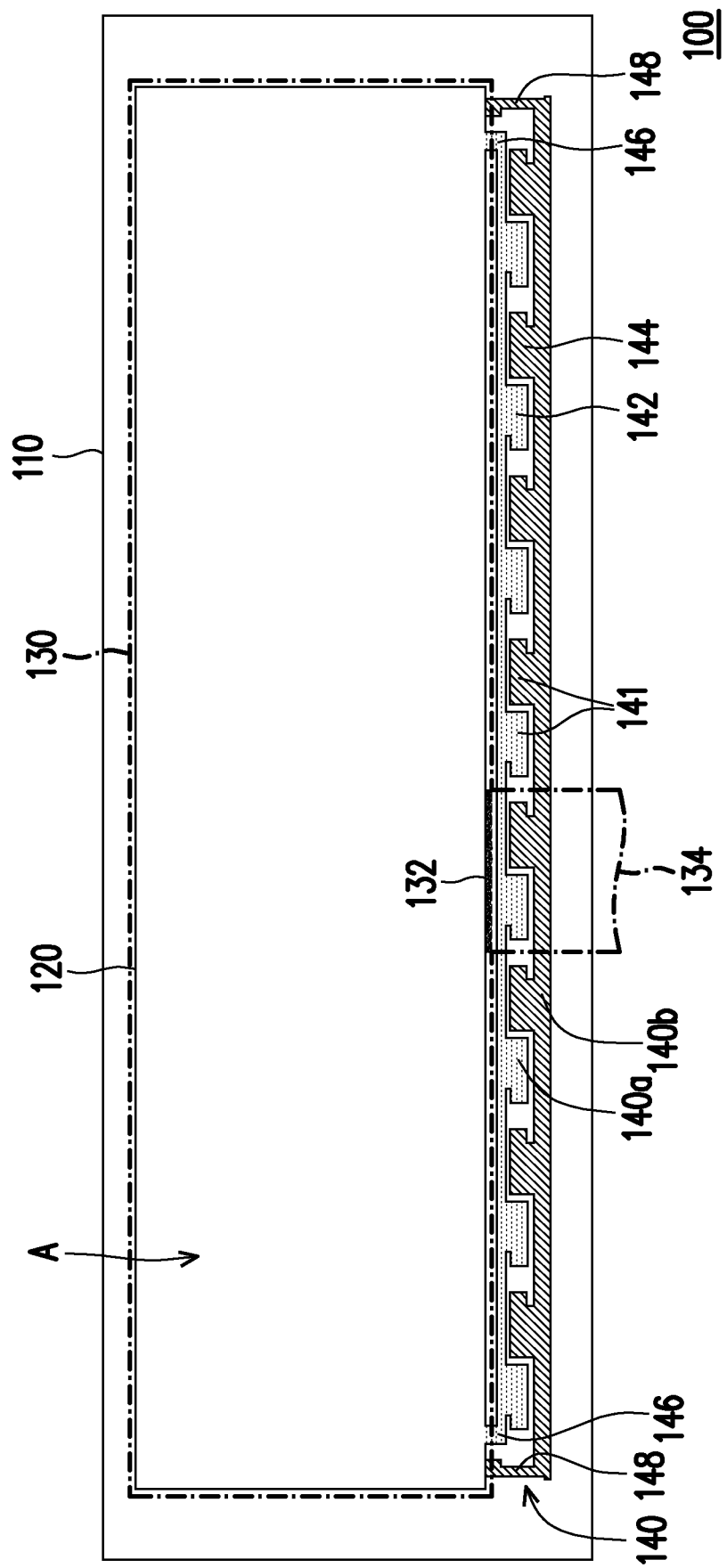
FIG. 1 is a schematic structural diagram of a display device according to an embodiment of the invention.

FIG. 1 is a schematic structural diagram of a display device according to an embodiment of the invention. Referring to FIG. 1, a display device 100 includes a backlight module 110, a screen anti-peeping device 120, and a display panel 130, the screen anti-peeping device 120 overlapping with and the display panel 130. In the present embodiment, the screen anti-peeping device 120 is disposed below the display panel 130. That is to say, the screen anti-peeping device 120 is located between the backlight module 110 and the display panel 130. An illuminating light beam from the backlight module 110 penetrates through the screen anti-peeping device 120 and the display panel 130 to provide an image for a viewer. An order of the screen anti-peeping device 120 and the display panel 130 is not limited in the invention. In the present embodiment, the display panel 130 requires a backlight module to provide a backlight source for display, but the invention is not limited to thereto. In another embodiment, the display device 100 may not include the backlight module 110. In this case, the display panel 130 may be a display panel without a backlight source, such as an organic light emitting diode display panel, an electrophoretic display panel, etc.

The display panel 130 is, for example, a liquid crystal display panel, but is not limited thereto. The display panel 130 includes at least one bonding area 132. The bonding area 132 is disposed on a substrate of the display panel 130 and is coupled to an outer lead 134. The outer lead 134 is, for example, a flexible printed circuit (FPC) or a chip on film (COF). The outer lead 134 is connected to the display panel 130 and a control circuit that is not shown in FIG. 1. The control circuit provides a display control signal. The display control signal is transmitted from the control circuit to the display panel 130 via the outer lead 134 through the bonding area 132. The display panel 130 displays an image according to the display control signal. In an exemplary drawing of the specification, for the convenience of description, the display panel 130 and the outer lead 134 are indicated by dashed frames to facilitate description of a structure below.

In the present embodiment, the screen anti-peeping device 120 is an electronically controlled birefringence device, but is not limited thereto. Because the screen anti-peeping device 120 adjusts a light exiting range of the illuminating light beam, the display device 100 may change a field of view (FOV) of a viewer to provide a normal viewing mode with a wide field of view or an anti-peeping mode with a narrow field of view.

The screen anti-peeping device 120 includes a display area A and a connection area 140. The display area A is configured to make the illuminating light beam pass and overlaps with a visual area of the display panel 130. The connection area 140 is configured with a component for being connected to a control lead (not shown, such as FPC). The screen anti-peeping device 120 includes a plurality of electrode sets in the connection area 140, each electrode set including at least one first electrode 142 and at least one second electrode 144. At least one of these electrode sets is selected to be coupled to at least one control lead, and the selected electrode set (for example, the electrode set 141 in FIG. 1) is misaligned with the bonding area 132 of the display panel 130. In particular, electrodes (including the first electrode 142 and the second electrode 144) of the selected electrode set 141 do not overlap with the bonding area 132. The bonding area 132 may partially or completely cover a portion of electrodes in the connection area 140, but when a manufacturer assemblies the screen anti-peeping device 120 and the display panel 130, an electrode set (such as the electrode set 141 in FIG. 1) in the bonding area 132 is completely staggered to be coupled to the control lead, so that the control lead coupled to the electrode set 141 may be kept off from (preventing overlapping) the outer lead 134 coupled to the bonding area 132. The screen anti-peeping device 120 receives a viewing-angle control signal through the control lead to adjust a field of view.

It should be specially noted that the screen anti-peeping device 120 further includes an insulating layer (not shown). The insulating layer is, for example, a silica gel material. In an embodiment, the insulating layer is room temperature vulcanization compound (RTV). After at least one electrode set is selected to be coupled to the control lead, the insulating layer covers other unselected electrode sets in the connection area 140 to prevent the unselected electrodes from being wet or oxidized. In the present embodiment, the insulating layer covers other electrode sets except the selected electrode set 141 in the connection area 140 of FIG. 1.

Details of implementation of the screen anti-peeping device 120 is further described below.

The screen anti-peeping device 120 includes a first conductive layer 140a and a second conductive layer 140b disposed side by side with the first conductive layer 140a in the connection area 140. The first conductive layer 140a includes a plurality of first protrusions as first electrodes 142, and the second conductive layer 140b includes a plurality of second protrusions as second electrodes 144, the first electrodes 142 and the second electrodes 144 being staggered. In the present embodiment, the first conductive layer 140a and the second conductive layer 140b are arranged in an up-and-down order, and a side that is of the first conductive layer 140a and that includes a first protrusion faces a side that is of the second conductive layer 140b and that includes a second protrusion, so that the first electrode 142 and the second electrode 144 are staggered. The first electrode 142 is located between the two second electrodes 144, and the second electrode 144 is located between two first electrodes 142. The first conductive layer 140a and the second conductive layer 140b may be made of a conductive material such as a metal or a transparent conductive material.

Figure 2:
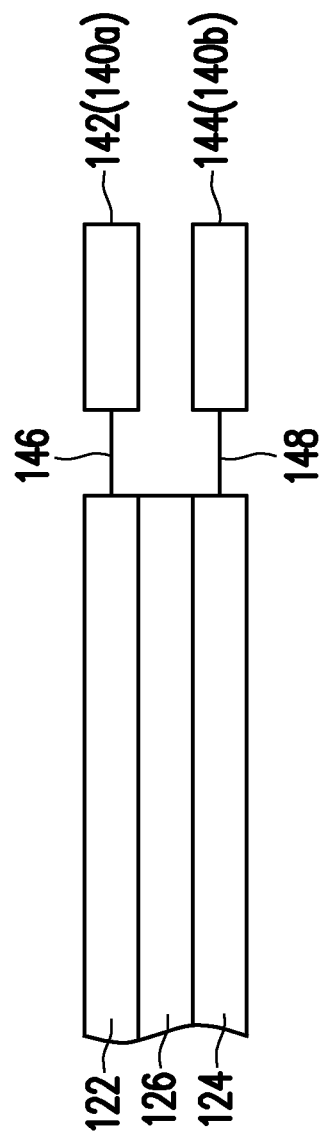
FIG. 2 is a schematic structural diagram of a screen anti-peeping device according to an embodiment of the invention.

FIG. 2 is a schematic structural diagram of a screen anti-peeping device according to an embodiment of the invention. Referring to FIG. 2 in combination with FIG. 1, in addition to the foregoing plurality of first electrodes 142 and plurality of second electrodes 144, the screen anti-peeping device 120 further includes an upper conductive layer 122, a lower conductive layer 124, and a viewing-angle adjustment layer 126. The viewing-angle adjustment layer 126 is disposed between the upper conductive layer 122 and the lower conductive layer 124. The upper conductive layer 122 and the lower conductive layer 124 are made of a conductive material such as indium tin oxide (ITO), but is not limited thereto. Internal circuits of the upper conductive layer 122 and the lower conductive layer 124 receive a viewing-angle control signal to provide a voltage difference for the viewing-angle adjustment layer 126. The viewing-angle adjustment layer 126 includes, for example, a liquid crystal layer. An arrangement direction of liquid crystal molecules is changed corresponding to the voltage difference between the upper conductive layer 122 and the lower conductive layer 124, and an illuminating light beam that penetrates through the viewing-angle adjustment layer 126 is further affected. Therefore, the viewing-angle adjustment layer 126 changes a light exiting range under the control of the voltage difference between the upper conductive layer 122 and the lower conductive layer 124, and a field of view of the viewer may be further changed.

In the present embodiment, the first conductive layer 140a is coupled to the upper conductive layer 122. The second conductive layer 140b is coupled to the lower conductive layer 124. In particular, two ends of the first conductive layer 140a include extended first signal import portions 146, respectively. The first signal import portions 146 are coupled to the upper conductive layer 122. Two ends of the second conductive layer 140b include extended second signal import portions 148, respectively. The second signal import portions 148 are coupled to the lower conductive layer 124. These first signal import portions 146 and second signal import portions 148 are configured to input a viewing-angle control signal from a control lead to an internal circuit of the screen anti-peeping device 120. In an embodiment, a material of the first conductive layer 140a and the first signal import portion 146 may be the same as the material of the upper conductive layer 122, for example, a conductive material such as indium tin oxide (ITO). In other embodiments, a material of the first conductive layer 140a and the first signal import portion 146 may be different from the material of the upper conductive layer 122. For example, the first conductive layer 140a and the first signal import portion 146 are made of a metal material such as gold or silver, but the upper conductive layer 122 is made of a conductive material such as indium tin oxide (ITO). Similarly, a material of the second conductive layer 140b and the second signal import portion 148 may be the same as or different from a material of the lower conductive layer 124.

In particular, the first conductive layer 140a is disposed to extend along an edge of the upper conductive layer 122, and the first signal import portions 146 are respectively close to the other two sides that are in the upper conductive layer 122 and that are adjacent to the edge. The second conductive layer 140b is disposed to extend along an edge of the lower conductive layer 124, and the second signal import portions 148 are respectively close to the other two sides that are in the lower conductive layer 124 and that are adjacent to the edge. In short, as shown in FIG. 1, the first conductive layer 140a and the second conductive layer 140b are both disposed on a bottom of the screen anti-peeping device 120, and the first signal import portion 146 is disposed close to left and right sides of the screen anti-peeping device 120, and the second signal import portion 148 is also disposed close to the left and right sides of the screen anti-peeping device 120.

As described above, the selected electrode set 141 is coupled to the control lead to receive the viewing-angle control signal. For example, the viewing-angle control signal is a voltage difference signal. After the first electrode 142 of the electrode set 141 receives a first voltage, the first voltage is simultaneously input to the upper conductive layer 122 from the left and right sides of the upper conductive layer 122 through these first signal import portions 146, respectively, so that the first voltage is expected to be evenly distributed on a surface of the upper conductive layer 122. After the second electrode 144 of the electrode set 141 receives a second voltage, the second voltage is simultaneously input to the lower conductive layer 124 from left and right sides of the lower conductive layer 124 through these second signal imports portions 148, respectively, so that the second voltage is expected to be evenly distributed on a surface of the lower conductive layer 124. Values of the first voltage and the second voltage are different. The upper conductive layer 122 and the lower conductive layer 124 apply the first voltage and the second voltage to the viewing-angle adjustment layer 126 respectively to change a field of view of the display device 100.

In the present embodiment, the upper conductive layer 122 or the lower conductive layer 124 may include a plurality of signal import portions, so that the upper conductive layer 122 or the lower conductive layer 124 includes a plurality input nodes at different positions to simultaneously receive the viewing-angle control signal, thereby reducing an influence of a change of the viewing-angle caused by a transmission path difference of the viewing-angle control signal in the display area A.

Figure 3:
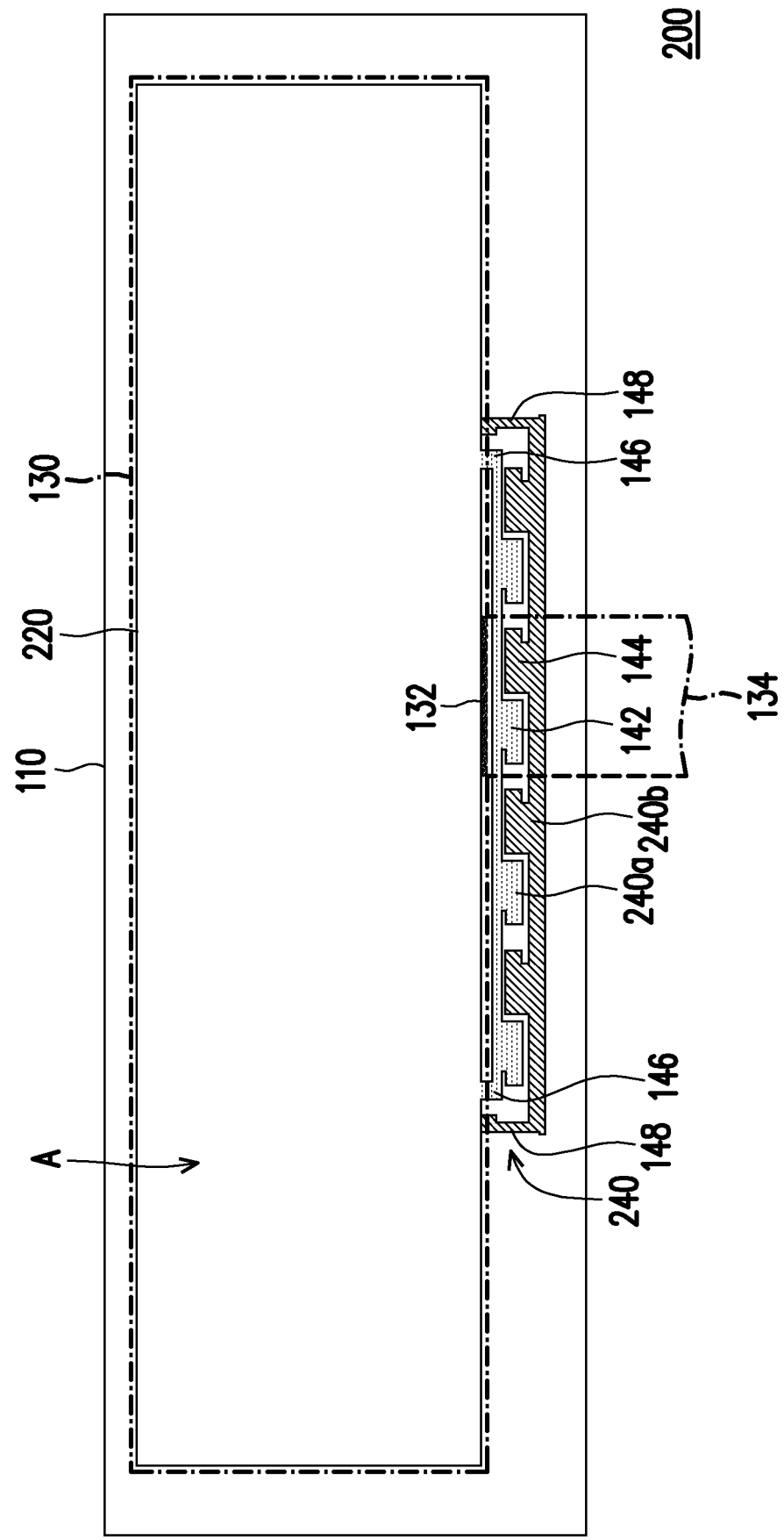
FIG. 3 is a schematic structural diagram of a display device according to an embodiment of the invention.

FIG. 3 is a schematic structural diagram of a display device according to an embodiment of the invention. Referring to FIG. 3, a structure of the display device 200 is similar to a structure of the display device 100, and similarly includes a backlight module 110 and a screen anti-peeping device 220 and a display panel 130 that are overlapped. The screen anti-peeping device 220 includes a display area A and a connection area 240 located below the display area A, a plurality of electrode sets being disposed in the connection area 240.

In the present embodiment, a description of the structure in FIG. 2 is also applicable to the display device 200. The display device 200 includes an upper conductive layer 122, a lower conductive layer 124, and a viewing-angle adjustment layer 126. The display device 200 further includes a first conductive layer 240a and a second conductive layer 240b disposed in the connection area 240. The first conductive layer 240a extends along an edge of the upper conductive layer 122 and is disposed in the center, and the second conductive layer 240b extends along an edge of the lower conductive layer 124 and is disposed in the center. The first conductive layer 240a and the second conductive layer 240b each includes a plurality of protrusions to respectively serve as a first electrode 142 and a second electrode 144, respectively. These first electrode 142 and these second electrode 144 have a same shape as those in the embodiment of FIG. 1 and are also staggered. The first electrode 142 and the corresponding second electrode 144 form an electrode set. In addition, two ends of the first conductive layer 240a include extended first signal import portions 146, respectively, and two ends of the second conductive layer 240b include extended second signal import portions 148, respectively. The first signal import portion 146 is coupled to an input node of an internal circuit of the upper conductive layer 122, and the second signal import portion 148 is coupled to an input node of an internal circuit of the lower conductive layer 124. In the present embodiment, functions of the first electrode 142, the second electrode 144, the first signal import portion 146, and the second signal import portion 148 are the same as those of the embodiment in FIG. 1, and the descriptions thereof are omitted herein.

In the embodiment of FIG. 1, the first conductive layer 140a and the second conductive layer 140b are covered with an electrode set below the display area A. The first signal import portion 146 and the second signal import portion 148 are disposed on left and right sides below the display area A, and a viewing-angle control signal is input at a position at an edge of the display area A. However, in the present embodiment, a plurality of electrode sets are disposed only in a portion of a range below the display area A. In an embodiment, a length of the first conductive layer 240a is not greater than 80% of a length of the upper conductive layer 122, and a length of the second conductive layer 240b is not greater than 80% of a length of the lower conductive layer 124. In the present embodiment, the first signal import portion 146 and the second signal import portion 148 in the connection area 240 provide at least two synchronized input terminals for an internal circuit of the display device 200 from a place below the display area A. The first signal import portion 146 inputs the viewing-angle control signal from positions at two ends of the first conductive layer 240a, and does not input the viewing-angle control signal from positions close to the left and right sides that are close to the upper conductive layer 122 and that are adjacent to a bottom edge.

It should be further noted that connected positions of the first signal import portion 146 and the second signal import portion 148 are not limited in the invention. After at least one electrode set in the connection area 240 is selected to be coupled to a control lead, other unselected electrode sets in the connection area 240 are covered with an insulating layer to prevent from being wet and oxidized.

Figure 4:
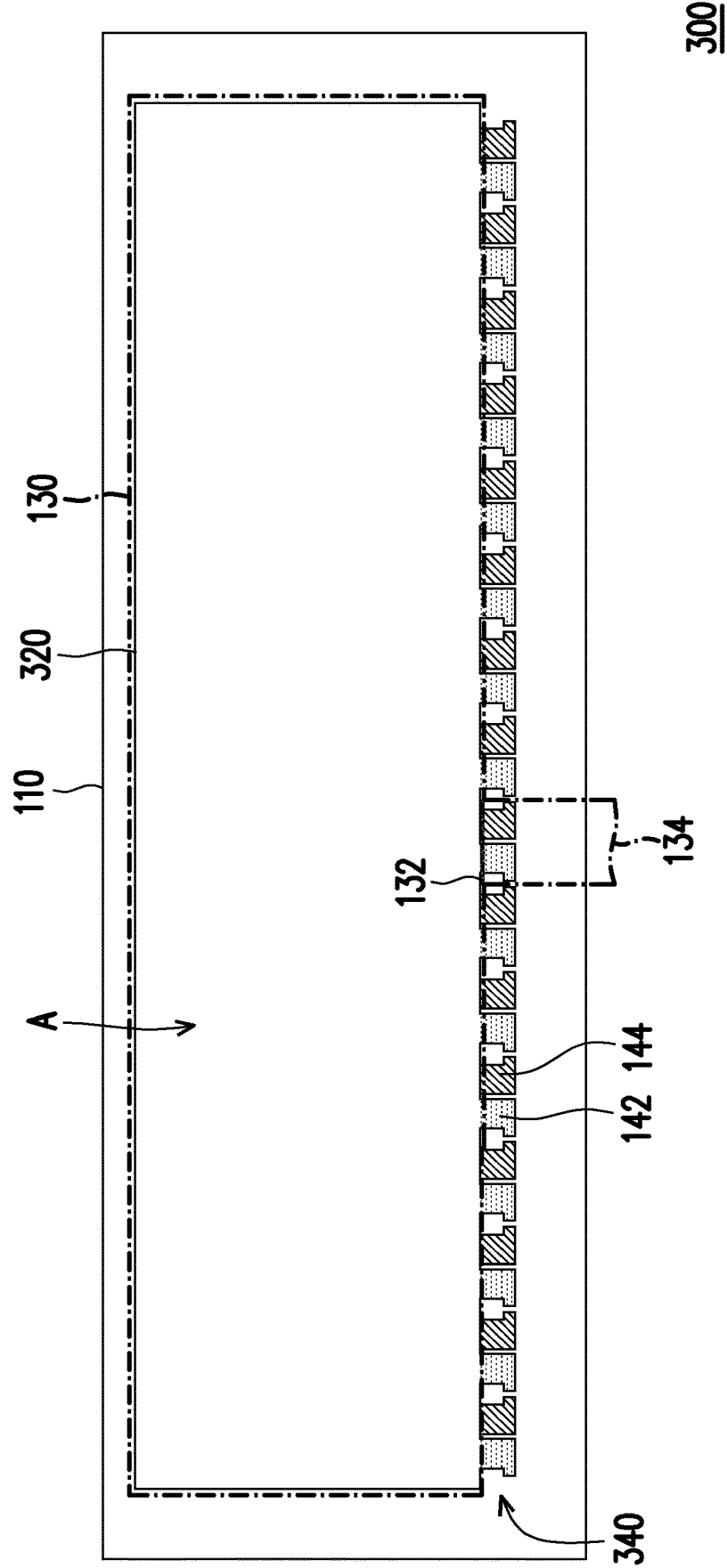
FIG. 4 is a schematic structural diagram of a display device according to an embodiment of the invention.

FIG. 4 is a schematic structural diagram of a display device according to an embodiment of the invention. Referring to FIG. 4, a display device 300 includes a backlight module 110 and a screen anti-peeping device 320 and a display panel 130 that are overlapped. In addition, a structure of the screen anti-peeping device 320 is also applicable to a description in FIG. 2. The screen anti-peeping device 320 includes a display area A and a connection area 340 located below the display area A. A plurality of metal pads (metal layers) are disposed as a first electrode 142 and a second electrode 144 in the connection area 340. The first electrode 142 and the second electrode 144 are staggered. The first electrode 142 is located between the two second electrodes 144, and the second electrode 144 is located between two first electrodes 142. The first electrode 142 and an adjacent second electrode 144 form an electrode set. The electrode sets in FIG. 4 are arranged in parallel in the connection area 340.

In FIG. 4, these first electrodes 142 are not connected to each other in the connection area 340. The other end of the first electrode 142 is directly coupled to an upper conductive layer 122 and provides a viewing-angle control signal for an internal circuit of the upper conductive layer 122. These second electrodes 144 are not connected to each other in the connection area 340. The other end of the second electrode 144 is directly coupled to a lower conductive layer 124 and provides a viewing-angle control signal for an internal circuit of the lower conductive layer 124.

In the present embodiment, several electrode sets are arranged side by side along edges of the upper conductive layer 122 and the lower conductive layer 124, and are arranged in full below the display area A. However, in another embodiment, the plurality of electrode sets are not arranged in full below the display area A. Only several electrode sets are arranged within a portion of a length range below the upper conductive layer 122 and the lower conductive layer 124, but the invention is not limited thereto.

Based on the foregoing, embodiments of the invention provide a display device and a screen anti-peeping device. The display device includes the display panel and the screen anti-peeping device. The screen anti-peeping device may change the field of view according to the voltage difference between the upper conductive layer and the lower conductive layer. Therefore, the display device has an anti-peeping mode. The connection area of the screen anti-peeping device of the invention includes a plurality of electrode sets to keep off the outer lead of the display panel. The electrode set misaligned with the connection portion of the outer lead is selected from these electrode sets to be coupled to the control lead. The viewing-angle control signal is transmitted to the screen anti-peeping device through the control lead to adjust the field of view. In this way, the screen anti-peeping device of the invention may be combined with display panels of different styles to reduce a production burden.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A display device, wherein the display device comprises a display panel and a screen anti-peeping device, wherein
   the display panel comprises at least one bonding area, wherein the at least one bonding area is configured to be coupled to an outer lead; and
   the screen anti-peeping device overlaps with the display panel and comprises a plurality of electrode sets, wherein each of the plurality of electrode sets comprises a first electrode and a second electrode, wherein at least one of the plurality of electrode sets is selected to be coupled to at least one control lead, and the selected at least one electrode set is misaligned with the at least one bonding area,
   wherein the plurality of electrode sets are arranged in parallel, a plurality of first electrodes in the plurality of electrode sets are not connected to each other, and a plurality of second electrodes are also not connected to each other, wherein the plurality of the first electrodes and the plurality of second electrodes are staggered.

2. The display device according to claim 1, wherein the screen anti-peeping device further comprises an insulating layer, covering other unselected electrode sets in the plurality of electrode sets.

3. A display device, wherein the display device comprises a display panel and a screen anti-peeping device, wherein the display panel comprises at least one bonding area, wherein the at least one bonding area is configured to be coupled to an outer lead; and the screen anti-peeping device overlaps with the display panel and comprises a plurality of electrode sets, wherein each of the plurality of electrode sets comprises a first electrode and a second electrode, wherein at least one of the plurality of electrode sets is selected to be coupled to at least one control lead, and the selected at least one electrode set is misaligned with the at least one bonding area, wherein the screen anti-peeping device comprises a first conductive layer and a second conductive layer disposed side by side with the first conductive layer, wherein the first conductive layer has a plurality of first protrusions as a plurality of first electrodes, and the second conductive layer has a plurality of second protrusions as a plurality of second electrodes, wherein the plurality of first electrodes and the plurality of second electrodes are staggered.

4. The display device according to claim 3, wherein two ends of the first conductive layer respectively have extended first signal import portions, and two ends of the second conductive layer respectively have extended second signal import portions, wherein a plurality of first signal import portions and a plurality of second signal import portions are configured to input a viewing-angle control signal from the at least one control lead to an internal circuit of the screen anti-peeping device.

5. The display device according to claim 4, wherein the screen anti-peeping device comprises an upper conductive layer, a lower conductive layer, and a viewing-angle adjustment layer, wherein the viewing-angle adjustment layer is disposed between the upper conductive layer and the lower conductive layer and is controlled by a voltage difference between the upper conductive layer and the lower conductive layer to change a field of view, wherein the plurality of first signal import portions are coupled to the upper conductive layer, and the plurality of second signal import portions are coupled to the lower conductive layer.

6. The display device according to claim 5, wherein the first conductive layer is disposed to extend along an edge of the upper conductive layer, and the plurality of first signal import portions are respectively close to two other sides in the upper conductive layer adjacent to the edge.

7. The display device according to claim 5, wherein the first conductive layer extends along an edge of the upper conductive layer and is disposed in a center, and a length of the first conductive layer is not greater than 80% of a length of the upper conductive layer.

8. A screen anti-peeping device, wherein the screen anti-peeping device comprises an upper conductive layer, a lower conductive layer, a viewing-angle adjustment layer, and a plurality of electrode sets, wherein the viewing-angle adjustment layer is disposed between the upper conductive layer and the lower conductive layer and is controlled by a voltage difference between the upper conductive layer and the lower conductive layer to change a field of view; and each of the plurality of electrode sets comprises a first electrode and a second electrode, wherein the first electrode is coupled to the upper conductive layer, and the second electrode is coupled to the lower conductive layer, wherein at least one of the plurality of electrode sets is selected to be coupled to at least one control lead, wherein the plurality of electrode sets are arranged in parallel, a plurality of first electrodes in the plurality of electrode sets are not connected to each other, and a plurality of second electrodes are also not connected to each other, wherein the plurality of the first electrodes and the plurality of second electrodes are staggered.

9. The screen anti-peeping device according to claim 8, further comprising an insulating layer, covering other unselected electrode sets in the plurality of electrode sets.

10. A screen anti-peeping device, wherein the screen anti-peeping device comprises an upper conductive layer, a lower conductive layer, a viewing-angle adjustment layer, and a plurality of electrode sets, wherein the viewing-angle adjustment layer is disposed between the upper conductive layer and the lower conductive layer and is controlled by a voltage difference between the upper conductive layer and the lower conductive layer to change a field of view; and each of the plurality of electrode sets comprises a first electrode and a second electrode, wherein the first electrode is coupled to the upper conductive layer, and the second electrode is coupled to the lower conductive layer, wherein at least one of the plurality of electrode sets is selected to be coupled to at least one control lead, and the screen anti-peeping device further comprises a first conductive layer and a second conductive layer disposed side by side with the first conductive layer, wherein the first conductive layer has a plurality of first protrusions as a plurality of first electrodes, and the second conductive layer has a plurality of second protrusions as a plurality of second electrodes, wherein the plurality of first electrodes and the plurality of second electrodes are staggered.

11. The screen anti-peeping device according to claim 10, wherein two ends of the first conductive layer respectively have extended first signal import portions, and two ends of the second conductive layer respectively have extended second signal import portions, wherein a plurality of first signal import portions and a plurality of second signal import portions are configured to input a viewing-angle control signal from the at least one control lead to an internal circuit of the screen anti-peeping device.

12. The screen anti-peeping device according to claim 11, wherein the first conductive layer is disposed to extend along an edge of the upper conductive layer, and the plurality of first signal import portions are respectively close to two other sides in the upper conductive layer adjacent to the edge.

13. The screen anti-peeping device according to claim 10, wherein the first conductive layer extends along an edge of the upper conductive layer and is disposed in a center, and a length of the first conductive layer is not greater than 80% of a length of the upper conductive layer.

* * * * *